US009503387B2

(12) United States Patent
Huang et al.

(10) Patent No.: US 9,503,387 B2
(45) Date of Patent: Nov. 22, 2016

(54) INSTANTIATING INCOMPATIBLE VIRTUAL COMPUTE REQUESTS IN A HETEROGENEOUS CLOUD ENVIRONMENT

(71) Applicant: CISCO TECHNOLOGY, INC., San Jose, CA (US)

(72) Inventors: Senhua Huang, Fremont, CA (US); Subramanian Chandrasekaran, San Jose, CA (US); Jaiganesh Mathaiyan, Cupertino, CA (US); Madhav Madhavshree, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 468 days.

(21) Appl. No.: 13/972,394

(22) Filed: Aug. 21, 2013

(65) Prior Publication Data
US 2015/0058486 A1  Feb. 26, 2015

(51) Int. Cl.
G06F 15/173 (2006.01)
H04L 12/911 (2013.01)
G06F 9/48 (2006.01)
G06F 9/455 (2006.01)
G06F 9/50 (2006.01)

(52) U.S. Cl.
CPC .......... H04L 47/70 (2013.01); G06F 9/4856 (2013.01); G06F 9/5027 (2013.01); G06F 2009/4557 (2013.01)

(58) Field of Classification Search
CPC ...................................................... H04L 67/10
See application file for complete search history.

(56) References Cited

U.S. PATENT DOCUMENTS

| | | | |
|---|---|---|---|
| 2012/0054731 A1* | 3/2012 | Aravamudan | G06F 8/63 717/170 |
| 2012/0131161 A1* | 5/2012 | Ferris | G06Q 30/02 709/223 |
| 2014/0058871 A1* | 2/2014 | Marr | G06F 9/45533 705/26.1 |
| 2014/0115161 A1* | 4/2014 | Agarwal | G06F 9/45558 709/226 |
| 2014/0149591 A1* | 5/2014 | Bhattacharya | H04L 67/1097 709/226 |
| 2014/0258155 A1* | 9/2014 | Suryanarayanan | H04L 63/10 705/318 |
| 2015/0222702 A1* | 8/2015 | Salle | G06F 9/4856 709/201 |
| 2015/0236977 A1* | 8/2015 | Terayama | H04L 47/762 709/224 |

OTHER PUBLICATIONS

JClouds, "Blobstore Guide," The Apache Software Foundation, © 2011-2013, 6 pages; http://jclouds.incubator.apache.org/documentation/userguide/blobstore-guide/.
JClouds, "User Guide: How to Use the Compute API and Tools," The Apache Software Foundation, © 2011-2013, 7 pages; http://jclouds.incubator.apache.org/documentation/userguide/compute/.
Wikipedia, the free encyclopedia, "Knapsack problem," [retrieved and printed Aug. 21, 2013], 11 pages; http://en.wikipedia.org/wiki/Knapsack_problem.

* cited by examiner

*Primary Examiner* — Kevin Bates
*Assistant Examiner* — Dae Kim
(74) *Attorney, Agent, or Firm* — Patent Capital Group

(57) ABSTRACT

Example embodiments disclosed herein can provide for receiving a compute request for migrating an application from a source environment to a target cloud, determining a configured option of a first resource associated with the application, and determining at least one solution in the target cloud for the application. The solution is based, at least in part, on the configured option. In more specific embodiments, when the configured option indicates the first resource is splittable, a number of second instances of a solution in the target cloud is greater than a number of first instances in the source environment. In further more specific embodiments, when the configured option indicates the first resource is mergeable, a number of second instances of a solution in the target cloud is less than the number of first instances in the source environment.

20 Claims, 4 Drawing Sheets

INSTANTIATING INCOMPATIBLE VIRTUAL COMPUTE REQUESTS IN A HETEROGENEOUS CLOUD ENVIRONMENT

TECHNICAL FIELD

This disclosure relates in general to the field of cloud computing and, in particular, to techniques for instantiating incompatible virtual compute requests in a heterogeneous cloud environment.

BACKGROUND

Computer systems and services have become critical components of enterprises and other entities. Enterprises and other entities have become increasingly reliant upon data centers to provide network services needed to conduct business or other desired activities. Consequently, the demand for compute, storage, and network capabilities has dramatically increased in recent years. Numerous service providers provide compute, storage, and network resources as a service to customers. These services are often provided by distributed computer systems over a network, which is referred to as a 'cloud' that can provide cloud computing services. As the computing needs of an entity change over time, it often becomes desirable to migrate computer systems to a cloud for various reasons, including access to increased compute, storage, and network services. The process of cloud migration, however, can require a significant effort. Service providers and their customers seeking migration need better tools to enable smooth migrations.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EMBODIMENTS

Overview

A method is provided in one example and includes receiving a compute request for migrating an application from a source environment to a target cloud, receiving a configured option of a first resource associated with the application, and determining a solution in the target cloud for the application. The solution is based, at least in part, on the configured option. In a more specific embodiment, the application runs on a number of first instances of a first instance type in the source environment, the first instance type includes the first resource having a first parameter, and the solution includes a number of second instances in the target cloud. The second instances can be associated with one or more instance types.

In further embodiments, when the configured option indicates the first resource is splittable, the number of second instances in the target cloud is greater than the number of first instances in the source environment. When the configured option indicates the first resource is splittable, at least one of the second instances may be associated with a second instance type including a second resource, a second parameter of the second resource may be less than the first parameter of the first resource, and the first resource and the second resource may be a same resource type. In further embodiments, when the configured option indicates the first resource is mergeable, the number of second instances in the target cloud is less than the number of first instances in the source environment. In more particular embodiments, the method can include reserving the second instances of the second instance type in the target cloud, and migrating the application to the target cloud to run on the second instances. In further particular embodiments, the first resource is one of a central processing unit (CPU), a memory element, and a disk storage. In yet further particular embodiments, the solution is based, in part, on an optimization criterion to minimize cost.

Example Embodiments

Figure 1:
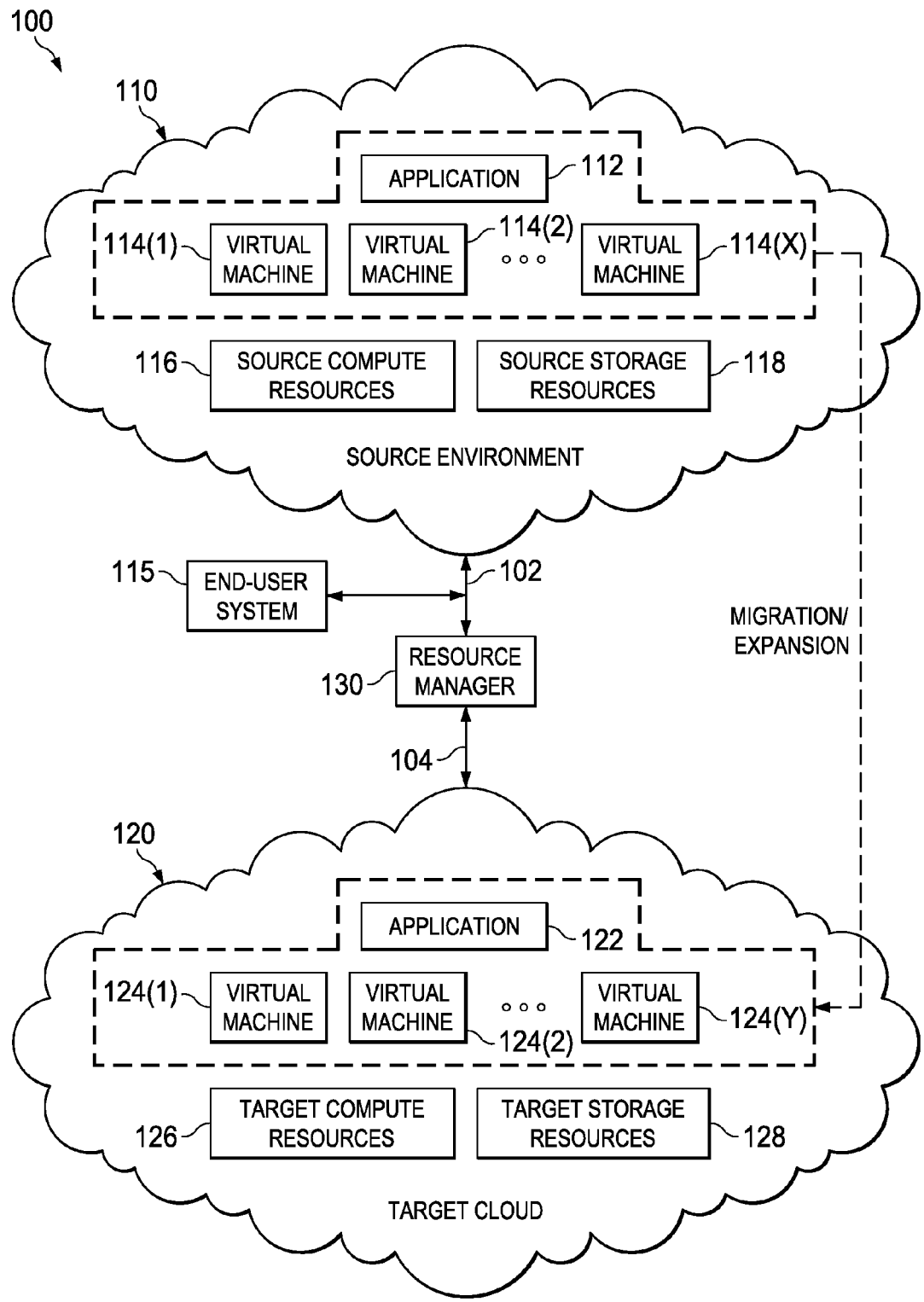
FIG. 1 is a simplified block diagram of a migration system for providing instantiation of incompatible virtual compute requests in a heterogeneous cloud environment according to at least one embodiment.

FIG. 1 is a simplified block diagram of a migration system 100 for providing instantiation of incompatible virtual compute requests in a heterogeneous cloud. In at least one embodiment, migration system 100 can include a resource manager 130 and a heterogeneous cloud (or hybrid cloud), which can include a source environment 110 and a target cloud 120. Source environment 110 could be a cloud (public or private), a data center, or a smaller private network. Source environment 110 includes services to be migrated to target cloud 120. In this example, the services include an example application 112 running on a plurality of virtual machines 114(1)-114(X). Source environment 110 also includes compute resources (e.g., computer processing units (CPUs)) and storage resources (e.g., memory elements) that enable application 112 to run on virtual machines 114(1)-114(X). Hence, the term 'resources' can include any such possibilities, as well as any other suitable resource (e.g., network resources of any kind, bandwidth resources, server resources, organizational resources, proxy resources, etc.).

The compute and storage resources of source environment 110 are denoted, generally, by source compute resources 116 and source storage resources 118, respectively. Target cloud 120 is illustrated with the migrated services from source environment 110. The migrated services are instantiated as application 122 running on virtual machines 124(1)-124(Y). Target compute resources 126 and target storage resources 128 enable the instantiation of the migrated services. In at least one embodiment, resource manager 130 can communicate with source environment 110 and end-user system 115 via network 102 and with target cloud 120 via network 104. Resource manager 130 facilitates the instantiation of incompatible virtual compute requests from source environment 110 to target cloud 120.

Elements of FIG. 1 may be coupled to one another through one or more interfaces employing any suitable connections (wired or wireless), which provide viable pathways for network communications. Migration system 100 may include a configuration capable of transmission control protocol/internet protocol (TCP/IP) communications for the transmission and/or reception of packets in a network. Migration system 100 may also operate in conjunction with a user datagram protocol/IP (UDP/IP) or any other suitable protocol, where appropriate and based on particular needs. Additionally, any one or more of these elements of FIG. 1 may be combined or removed from the architecture based on particular configuration needs.

For purposes of illustrating the techniques of migration system 100, it is important to understand the activities that may be present in a computer system, such as migration system 100 shown in FIG. 1. The following foundational information may be viewed as a basis from which the present disclosure may be properly explained. Such information is offered for purposes of explanation only and, accordingly, should not be construed in any way to limit the broad scope of the present disclosure and its potential applications.

The need for complex computer systems and services has furthered the demand for compute, storage, and network resources in cloud environments. Numerous service providers offer cloud computing services (e.g., compute, storage, and network resources in distributed computer systems) to customers. These services help offload the responsibility from an entity that consumes the resources and help facilitate quicker and easier access to application services and information.

When an entity decides to subscribe to cloud services for its computing needs, typically, existing applications used by the entity are migrated from an existing computer systems environment to a new cloud environment. The new cloud environment, which could be a public or private cloud, is referred to herein as the 'target cloud' (e.g., target cloud 120). The existing computer systems environment, or 'source environment', could be another public or private cloud environment, a traditional data center, a colocation provider, or the like. In some cases, an entity already using a cloud environment for its application services may desire migration to another cloud in order to take advantage of benefits offered by a different service provider, to switch from a public cloud to a private cloud or vice versa, etc.

Successfully migrating virtual or other applications from a source environment to a target cloud can involve a coordinated effort by the customer (i.e., the entity associated with the applications to be migrated) and the service provider of the target cloud. To prepare for a migration, a customer generally collects its compute and storage resource requirements. For example, a customer may determine the number of computer processing units (CPUs) of a particular speed and the amount of memory needed in the source environment to run a particular application or multiple applications, etc. In addition, the customer may also determine the number of instances needed in the source environment for the application. The target cloud, however, may have different offerings as categories of these compute resources. Consequently, it may not be possible to transfer an application from a particular category of compute resources in the source to the same category of compute resources in the target cloud.

Typically, most service offerings by a cloud provider tend to be categorized. For example, one cloud provider may offer the following instance types: standard, micro, high-memory, and high-CPU. Each instance type may have its own specification on memory size, virtual CPU, disk size, and platform type. Another cloud provider may divide categories based on the memory size and then possibly further categorizations. In addition, in some scenarios an entity may have its own virtualization platform. For example, some tools may allow a user (e.g., Information Technology (IT) administrator) to customize their virtual compute resources by resource type such as memory, disk, and virtual CPU (vCPU).

Although these cloud services are generally acceptable in an isolated and homogeneous environment, many customers desire a hybrid cloud solution instead. A hybrid cloud solution may require deployment in both private and public clouds or deployment in multiple public clouds. When moving an application that is running on one or multiple virtual machines (VM) (i.e., a unit of virtual compute), the problem of converting the VM format in terms of resource requirements (e.g., memory, CPU, disk) emerges when the offering of the source environment and the target cloud differs.

Techniques for migrating a virtual machine from one host to another host, from one cluster to another cluster, and even from one data center to another data center, generally address the transfer of machine states (e.g., memory snapshots, etc.), but do not consider the problem of an incompatible instance type between the source environment and the target cloud. Some heuristic algorithms can calculate solutions to Knapsack problems, where financial constraints are applied to resource allocation. Without taking into account which resource types of a source can be split when migrated to a new cloud, however, these algorithms cannot be applied to virtual machine migrations in the hybrid cloud scenarios.

Generally, conservative approaches are used to ensure sufficient memory, CPU and disk resources are available on a target cloud during migrations involving incompatible instance types. In one approach, if an exact match for a particular resource is not found in the target cloud, then a resource having bigger or larger parameters (e.g., number of bytes, number of bits, speed, number of processors, etc.) may be used instead. For example, if a source application uses 1 Gigabyte memory, 100 Gigabyte hard drive, and 2 CPUs, and the target cloud does not have an exact match, then the application may be implemented in the target cloud using 2 Gigabyte memory, 1 Terabyte hard drive, and 16 CPUs, if those specifications represent the next largest sizes in the target cloud. This approach and others, however, raise several problematic issues. First, resources may be wasted in the target cloud and consequently, may increase the cost of migration. Second, the maximum number of times an instance can potentially migrate may be limited, as each migration potentially bloats the instance. Customers and cloud service providers need techniques that provide improved efficiency when migrating applications from a source environment to a target cloud with incompatible instance types.

In accordance with one example implementation, migration system 100 can resolve the aforementioned issues associated with incompatible virtual compute requests in a migration from a source environment to a target cloud by instantiating applications and intact virtual machines in the target cloud based on which resource types are splittable and/or mergeable. A user (e.g., the customer) can configure options to categorize each type of resource, such as CPU, memory, disk, etc., which is associated with an application to be migrated. Resource options are dependent upon the associated application requirements, and can be used to categorize a compute or storage resource as splittable, non-splittable, mergeable, or non-mergeable. A splittable resource is one that can be split between two or more compute instances to fulfill the compute requirements for that particular type of resource component. A 'compute instance' or 'instance' as used herein, is the instantiation of a virtual machine in which an application can run. A mergeable resource is one that can be merged with other resources into a single compute instance and still fulfill the compute requirements for that particular type of resource component. A resource manager can compute an optimal solution in the target cloud based, at least in part, on the configured options (i.e., splittable, non-splittable, mergeable, non-mergeable) and the available instance types in the target cloud. As used herein, a 'solution' is intended to mean a determined number of instances of one or more instance types in a target cloud that can satisfy a particular compute request. Other configured options, such as optimization criteria, may also be considered when determining a solution. For example, when multiple solutions can satisfy a particular compute request, an optimal solution may be selected for a requested migration based on optimization criteria.

Turning to the infrastructure of FIG. 1, migration system 100 in accordance with at least one embodiment is shown. Generally, migration system 100 can be implemented in any type or topology of networks. Networks 102 and 104 represent a series of points or nodes of interconnected communication paths for receiving and transmitting packets of information that propagate through migration system 100. The networks offer a communicative interface between nodes, and in at least one embodiment, may be configured as any local area network (LAN), virtual local area network (VLAN), wide area network (WAN) (e.g., the Internet), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

Application 112 is provided as an example of a virtual application that may be running in source environment 110. Application 112 can be a scalable application that is deployable across multiple virtual machines 114(1)-114(X). Application 112 can be a virtual application (vApp) or services in any other scalable deployment. Application 112 could be a single-tier application or a multi-tier application, with policies, and service levels, for example. Application 112 may run on a set of virtual machines 114(1)-114(X) with specific source compute resources 116 and source storage resources 118. Virtual machines, such as virtual machines 114(1)-114(X), are software implementations of a machine that execute software programs like a physical machine. Compute and storage resources 116 and 118 could include, for example, specific CPU, memory, architecture, disk storage, etc.

FIG. 1 illustrates application 112 and virtual machines 114(1)-114(X) being migrated or expanded from source environment 110 to target cloud 120, and instantiated as application 122 running in virtual machines 124(1)-124(Y) in target cloud 120. Target compute resources 126 and target storage resources 128 represent compute and storage resources across which application 122 and virtual machines 124(1)-124(Y) are deployed. In target cloud 120, however, target compute resources 126 and target storage resources 128 may not have one-to-one correspondence to source compute resources 116 and source storage resources 118, respectively.

Compute resources 116 and 126 and storage resources 118 and 128 represent hardware, software, and firmware resources offered in their corresponding environments. Generally, compute resources represent CPUs (or any other processors) and memory elements that may accompany the CPUs (or other processors). Storage resources generally represent data storage options for storing data or other information (e.g., disk storage). Such storage could include internal or external storage to a network element and could incorporate various network storage techniques such as, for example, network attached storage (NAS) or storage area network (SAN). Compute and storage resources 126 and 128 of target cloud 120 could be grouped into particular offerings that are different than compute and storage offerings in source environment 110. In particular, parameters of certain resources in target cloud 120 may not have one-to-one correspondence with parameters of resources in source environment 110 (e.g., 2 vCPU with 1 GB vs. 1 vCPU with 512 MB). Additionally, the brands of resources in target cloud 120 may differ from the brands of resources in source environment 110.

End user system 115 may be inclusive of any computer configured to enable user input and communication between a user and resource manager 130, and between a user and source environment 110. End user system 115 can include suitable interfaces to a human user, such as a display, a keyboard, a mouse, a touchpad, a remote control, or other terminal equipment configured to facilitate communication of information from and to the user. End user system 115 can include, for example, personal computers, laptops, user workstations, terminal stations, tablets, mobile devices, etc.

In at least one embodiment, resource manager 130 can run on any server external to source environment 110 and target cloud 120. In one example, resource manager 130 could be deployed in a data center of a service provider associated with target cloud 130. Resource manager 130 could alternatively be deployed in target cloud 120, in another cloud, or in any other computer system or network having communication access to source environment 110 and target cloud 120. Moreover, at least some communication with source environment 110 may include interaction with a user via a user interface of end-user system 115 that enables the user to provide information needed by resource manager 130 to determine a solution in target cloud 120 to instantiate incompatible compute requests. As used herein, a 'compute request' is intended to include a request to migrate an application, such as a virtual application running on one or more virtual machines, from a source environment to a target cloud, and can include compute and storage resource requirements for the application being migrated. In at least one embodiment, the compute and storage resource requirements of a compute request may be provided in terms of resource requirements for the source environment.

Figure 2:
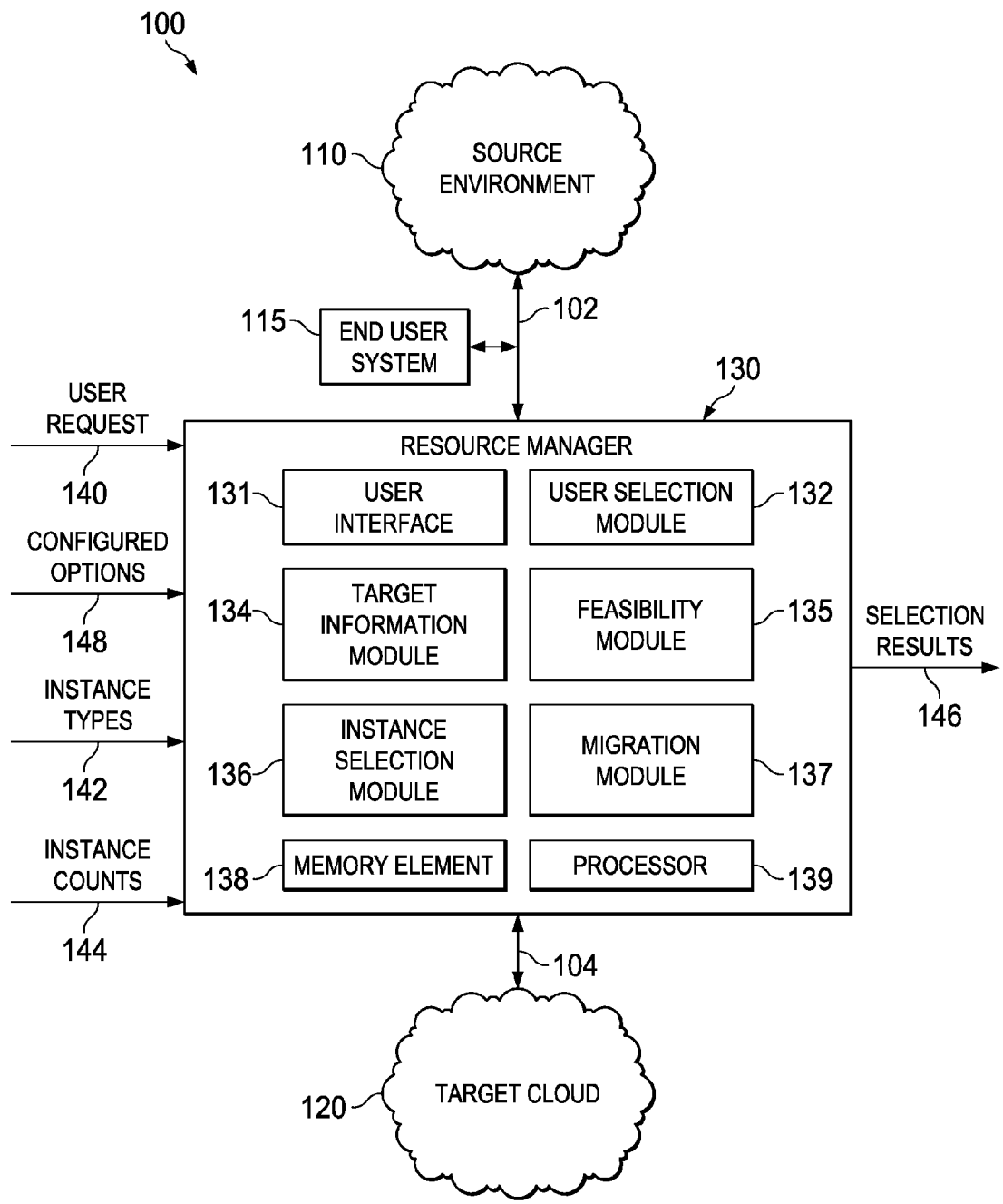
FIG. 2 is a simplified block diagram illustrating additional details that may be associated with the migration system according to at least one embodiment.

Turning to FIG. 2, FIG. 2 illustrates additional details that may be associated with migration system 100 according to at least one embodiment. Resource manager 130 can include a user interface 131, a user selection module 132, a target information module 134, a feasibility module 135, an instance selection module 136, and a migration module 137. Resource manager 130 may also include at least one memory element 138 and at least one processor 139. Resource manager 130 can receive various inputs, and at least some examples are illustrated in FIG. 2. A user request 140 to perform a migration may be received from end-user system 115. Configured options 148 may be provided by a user and can include various options such as splittable/mergeable categorizations, and possibly optimization criteria (e.g., cost). Instance types 142 and instance counts 144 may be provided by target cloud 120. Resource manager 130 can also provide output, designated by selection results 146, which can include one or more solutions for migrating application 112 and associated virtual machines 114(1)-114

(X) to target cloud 130 and being instantiated as application 122 and associated virtual machines 124(1)-124(Y). In at least one embodiment, the solution can include a number of instances for each instance type in target cloud 120 that can satisfy the compute request.

In at least one embodiment, resource manager 130 is a network element, which is meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In an example implementation, network elements of migration system 100, such as resource manager 130, may include software modules (e.g., user interface 131, user selection module 132, target information module 134, feasibility module 135, instance selection module 136, migration module 137) to achieve, or to foster, operations as outlined herein. These modules may be suitably combined in any appropriate manner, which may be based on particular configuration and/or provisioning needs. In example embodiments, at least some of these operations may be carried out by hardware and/or firmware, implemented externally to these elements, or included in some other network element to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Whether combined or separated, in whole or in part, user interface 131, user selection module 132, target information module 134, feasibility module 135, instance selection module 136, and migration module 137 represent various activities according to at least one embodiment disclosed herein. User interface 131 and user selection module 132 can coordinate to provide a graphical user interface for display on a display monitor or screen of end user system 115. The graphical user interface can provide selection options for a user (e.g., an IT administrator for a customer seeking to migrate one or more computing services) to request migration for a particular application or a set of applications to a target cloud, such as target cloud 120. In at least one embodiment, specifications or parameters of compute resources, required for running the selected application or applications in the current source environment, may be identified by the user. The identified specifications or parameters may be provided as input (e.g., user request 140) to resource manager 130 as part of a compute request.

Numerous different approaches could be taken to generate compute requests for a workload in a source environment to be migrated to a target cloud (e.g., a public cloud or new private cloud infrastructure). In at least one embodiment, the current compute instances on which the application is running could be examined, and the number of different types of compute instances could be determined. By way of illustration, consider an enterprise that has a virtual application for human resources ('HR vApp'), which runs in a source environment on 100 medium instances. Each of the medium instances serves 10,000 employees and has a 32-bit platform with 1 virtual CPU (vCPU), 1024 Megabytes (MB) memory, and 20 Gigabytes (GB) disk storage. Also assume the Information Technology (IT) Department of the enterprise receives a request to expand the workload in its new data center that deploys a different cloud solution so that the HR vApp can serve 20,000 employees. One option for estimating a solution for the compute request is to determine what is currently used by the HR vApp and simply replicate those instances (i.e., 100 instances each of 32-bit platforms with 1 vCPU, 1024 MB memory, and 20 GB disk storage).

In other embodiments, more sophisticated techniques may be used to determine a compute request for a workload migration. 'Workload migration' and 'migration' as used herein, are intended to mean moving or expanding an application running on one or more virtual machines from a source environment to a target cloud. For example, in the previous illustration, a work load analysis could be performed (e.g., by the IT department) on the existing HR vApp to obtain the actual compute and storage resources being used. More specifically, the actual amount of CPU, memory, and disk storage used by the HR vApp on each instance could be determined using work load analysis. In at least one embodiment, this profiling could be performed on peak usage times and/or average usage times. Compute and storage resources having appropriate parameters, which are neither excessive nor insufficient, could be identified based on the profiling.

In yet another embodiment, a statistical distribution of the usage of resources among the compute instances could be determined. For example, assume the HR vApp consumes 90% of the allocated memory resources in 95% of the instances with a mean memory usage of 900 MB. If the vApp is highly scalable in terms of memory usage, then the authorized user of the HR vApp (e.g., IT administrator for the enterprise) could identify the memory of the current compute instances as splittable and/or mergeable. This profiling can result in a set of constraints on the work load migration. Depending on whether the profiling is done per instance or collectively on all instances, the number of constraints might differ. Nevertheless, a set of constraints can be expressed in terms of each resource component (e.g., CPU, memory, disk storage, etc.) that resource manager 130 needs to manage during the workload migration.

The graphical user interface of end user system 115 may provide options for categorizing the identified resources. The resources could include, but are not limited to, CPU, memory, and disk storage associated with the selected one or more applications. In particular, the graphical user interface could provide options to categorize resources as splittable or mergeable. In at least one embodiment, other options may also be provided to positively categorize resources when they are non-splittable or non-mergeable. Alternatively, non-splittable and non-mergeable may be default categorizations of a resource when splittable and mergeable options are not configured for the particular resource. These configured options 148 can be provided as input to resource manager 130, and may be included in the compute request.

In at least one embodiment, a policy-based approach may be implemented. Policies may specify whether each type of resource is splittable, non-splittable, mergeable, or non-mergeable. The policies may also specify how a resource type or a bundle of resource types can be split. In this embodiment, the policies could be specific to particular types of applications or to specific applications as the applications determine whether underlying resources are splittable or mergeable. The policies can serve as additional input to resource manager 130.

Generally, splittable and mergeable properties are quantifiable and non-splittable and non-mergeable properties are qualitative. One underlying assumption can be that applications running on virtual machines do not have persistent states. This is generally true for client-server applications such as, for example, online video format conversion and for online image processing and sharing. Essentially, splittable resources and mergeable resources have an "additive" property and an "exchangeable" property. An additive property of a resource can mean that splitting the resource into multiple instances is equivalent to a single instance of the resource. For example, consider an application that requires 10 GB memory and runs on a single compute instance that has 10 GB memory. If the memory has an additive property, then the application can be instantiated on 10 compute instances, each having 1 GB memory. Conversely, an additive property may also imply that combining or merging multiple resources into a single instance of the resource is equivalent to multiple instances of the resource. An exchangeable property of a resource indicates that the resource could be any brand as long as it has the same required specifications or parameters (e.g., speed and/or capacity, etc.).

Different resources are splittable and/or mergeable. For example, disk space can be splittable, but platform type (e.g., 64-bit versus 32-bit) is generally not splittable. Each splittable resource has its own behavior on how to split. For example, the compute power of an instance with 1 GB memory might be comparable to the compute power of 2 instances with 512 MB memory each. Furthermore, multiple resources can be bundled together and tagged as splittable. Some resources of compute instances from a source cloud may alternatively be merged into a single large compute instance for any desired need or preference of the user. A user can tag a resource or a bundle of resources as "mergeable." The user may also provide rules for merging instances of the same requests into bigger instances.

Configured options 148 may also include optimization criteria to be used by instance selection module 136 to generate selection results 146. One example optimization criterion could be minimizing the total cost of migration. Accordingly, instance selection module 136 can be configured to factor in one or more optimization criteria, such as the criterion of minimizing the total cost of migration, when selecting instances in target cloud 120 in which the application and virtual machines can be instantiated.

Target information module 134 may be configured in resource manager 130 to obtain specifications of available instance types 142 and instance counts 144 provided by target cloud 120. Instance types (e.g., small, medium, large, standard, micro, high, high-CPU, etc.) may be specific to each particular cloud service provider. Thus, instance type information can be obtained based on instance types of the particular cloud service provider of the target cloud. Instance counts can include available numbers of instances for each instance type. Consider an example scenario for a cloud service provider having instance types in a target cloud categorized as small, medium, and large. In this scenario, the values for vCPU, memory, and other resources can be obtained for available small instance types, medium instance types, and large instance types in the target cloud. In addition, the number of available small instances, medium instances, and large instances in the target cloud may also be obtained. For a public cloud, however, these numbers may effectively be infinity (or unlimited). In at least one embodiment, application programming interfaces (APIs) provided by the cloud service provider of the target cloud may be used to obtain this information. In at least one other embodiment, this information may be hard coded into resource manager 130, or otherwise available in a memory element accessible to resource manager 130.

Feasibility module 135 may be provided to determine whether prerequisite resources are available in target cloud 120 when a migration request has been received. In at least one embodiment, feasibility module 135 can include one or more heuristic algorithms to perform a feasibility determination. Typically, an underlying assumption of a public cloud offering is that its resources are immense and, therefore, no feasibility check is needed. In scenarios in which a target cloud is a private data center, however, a feasibility check may be needed. In one example, the non-splittable resources (e.g., platform and operating system) of the source environment may need a direct correspondence to resources in the target cloud. In another example, a constraint may be applied to various resources. Assume a maximum number of available small instances in a target cloud is 10,000. A constraint may be applied on how many small instances can be used in the target cloud and, depending on how many small instances are needed by the migrating application, the constraint could potentially prevent the migration. Moreover, although feasibility checking may not normally be needed for public clouds, it could nevertheless be configured for such target cloud, for example, based on the preferences of the particular service provider.

Instance selection module 136 can be configured in resource manager 130 to determine appropriate solutions for work load migration from a source environment to a target cloud. More specifically, instance selection module 136 may compute resulting instantiation of the migrated application in target cloud 120. In at least one embodiment, the flexibility of an application, in terms of compute and/or storage resources, can be leveraged to scale out on computer components in the target cloud. Optimization variables in each constraint can be marked as splittable/non-splittable and mergeable/non-mergeable to enable instance selection module 136 to determine solutions for work load migration in the target cloud. Accordingly, an appropriate solution for a particular application to be migrated can include selected compute instances in the target cloud that leverage the flexibility of the application (i.e., splittability and/or mergeability) to be instantiated using resources in the target cloud that are different than resources used in the source environment. Additionally, intelligent calculation or gathering resource requirements during an application migration based on work load analysis can be used to further improve the rate resource allocation efficiency because compute requests can be generated based on the actual usage of resources rather than a planned usage of resources.

Numerous different implementations and/or algorithms could be configured to compute selection results 146. In one possible embodiment, instance selection module 136 could incorporate feasibility determination functions in whole or in part. An algorithm could divide all the migrating virtual compute requests into different categories by their non-splittable properties (e.g., platform and operating system). It could also divide the available types of virtual compute instances from the target cloud using the same properties. Thus, the categories defined by the non-splittable properties of the virtual compute requests are a subset of the available categories from the target cloud. If, at the target cloud, no resources are available at the target cloud that have the requested category, then the migration cannot be done. In addition, for each category, the algorithm could try to minimize the cost by solving a Knapsack problem, which could take many different forms. In one example of an optimization criterion in the form of a cost constraint, the algorithm could maximize the performance of converted/migrated instances in target cloud 120.

Instance selection module 136 may generate selection results 146, which provide one or more solutions for the compute request. Selection results 146 can provide a number of instances for each instance type in a target cloud that is able to satisfy the compute request. Thus, the application and associated virtual machines of the compute request may be migrated to the target cloud based on one of the solutions in selection results 146. The virtual machines can be migrated intact. The instance types of selection results 146 may be different than the instance types of the source environment. Once selection results 146 have been generated, migration module 137 can handle the migration of the application or set of applications from source environment 110 to target cloud 120.

Figure 3:
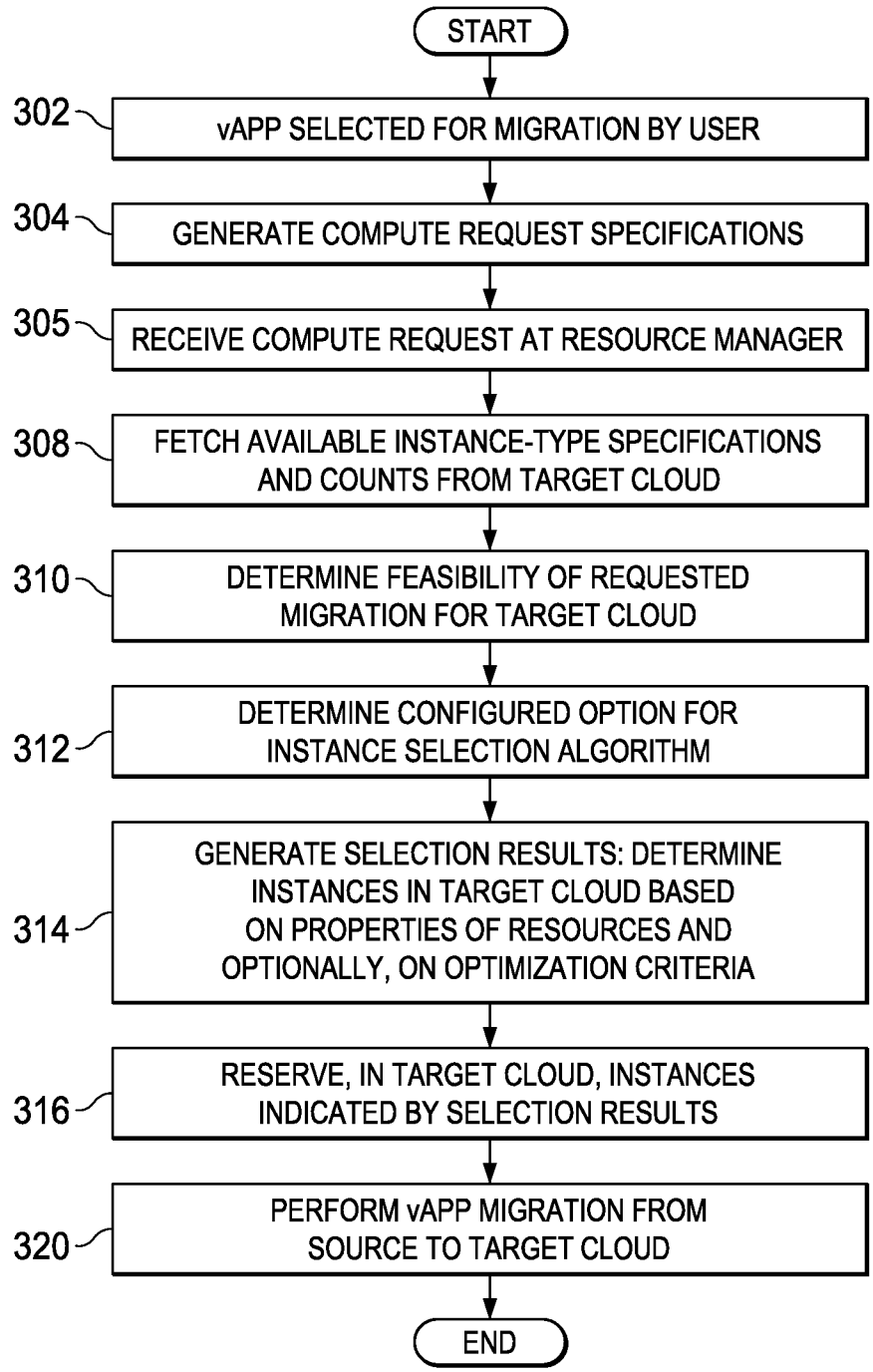
FIG. 3 is a flow diagram illustrating possible activities associated with the migration system according to at least one embodiment.

Turning to FIG. 3, a flow diagram 300 illustrates example activities that may be associated with embodiments of migration system 100 to instantiate incompatible virtual compute requests in heterogeneous cloud environments. In at least one embodiment, a set of operations corresponds to the activities of FIG. 3. In one example, a network element, such as resource manager 130, may perform one or more operations of the set of operations. This network element may comprise means, including for example, processor 139, for performing such operations. In at least one embodiment, one or more modules of resource manager 130 (e.g., user selection module 132, target information module 134, feasibility module 135, instance selection module 136, and/or migration module 137) are configured to perform, when executed by a processor, one or more operations of the set of operations.

At 302, a virtual application (vApp) may be selected for migration by a user. The vApp may be selected by the user, for example, via end user system 115. The vApp selection could be a vApp instantiated in a source environment such as a private data center, a private cloud, or a public cloud. At 304, compute request specifications for the migrated/expanded workload can be generated in various ways (e.g., replicate what is currently being used, perform a work load analysis on the existing application to determine actual resource usage, determine a statistical distribution of the usage on different resources among all compute instances). At 305, resource manager 130 can receive a compute request with the compute request specifications, which may be provided from end user system 115. At 306, resource manager 130 can receive from the user, a target cloud selection.

At 308, resource manager 130 can fetch the available instance type specifications and instance counts from the selected target cloud. In at least some embodiments, this information can be obtained by APIs provided by the target cloud service provider, or the information can be hardcoded in the resource manager or otherwise accessible to the resource manager in some external element.

At 310, the feasibility of the requested migration for the target cloud may be determined. The feasibility determination can assess whether the migration can be successfully performed based on the particular resources of the target cloud and the particular requirements of the application and virtual machines to be migrated. The feasibility determination will be discussed in more detail with reference to FIG. 4.

At 312, resource manager 130 determines configured options indicating which resources are splittable, non-splittable, mergeable, and/or non-mergeable. These options may be configured by a user (e.g., customer requesting migration) via an end user system and may be provided in the compute request sent to resource manager 130. In this case, resource manager 130 can determine the configured options from the compute request. The resource manager can also receive other options (e.g., optimization criteria such as minimizing cost) to be used by instance selection module to determine the compute instances in the target cloud in which the application and its virtual machines are to be instantiated. In at least one embodiment, these other options may also be provided in the compute request sent to resource manager 130.

At 314, selection results are generated. In at least one embodiment, the instance selection module can determine compute instances in the target cloud based on configured options of the resources and optionally, on one or more other options such as an optimization criterion (e.g., minimizing cost). Depending on the particular scenario, multiple solutions may be generated and provided in selection results 146. For example, any one of 5 large instance types, 10 medium instance types, or 20 small instance types may be suitable for migrating a particular application to the target cloud, depending on the particular application resource requirements and the particular specifications of the instance types in the target cloud.

At 316, the resource manager can reserve, in the target cloud, instances indicated by one of the solutions from the selection results. At 320, the vApp migration may be performed to migrate the vApp and associated virtual machines from the source environment to the reserved instances in the target cloud.

Figure 4:
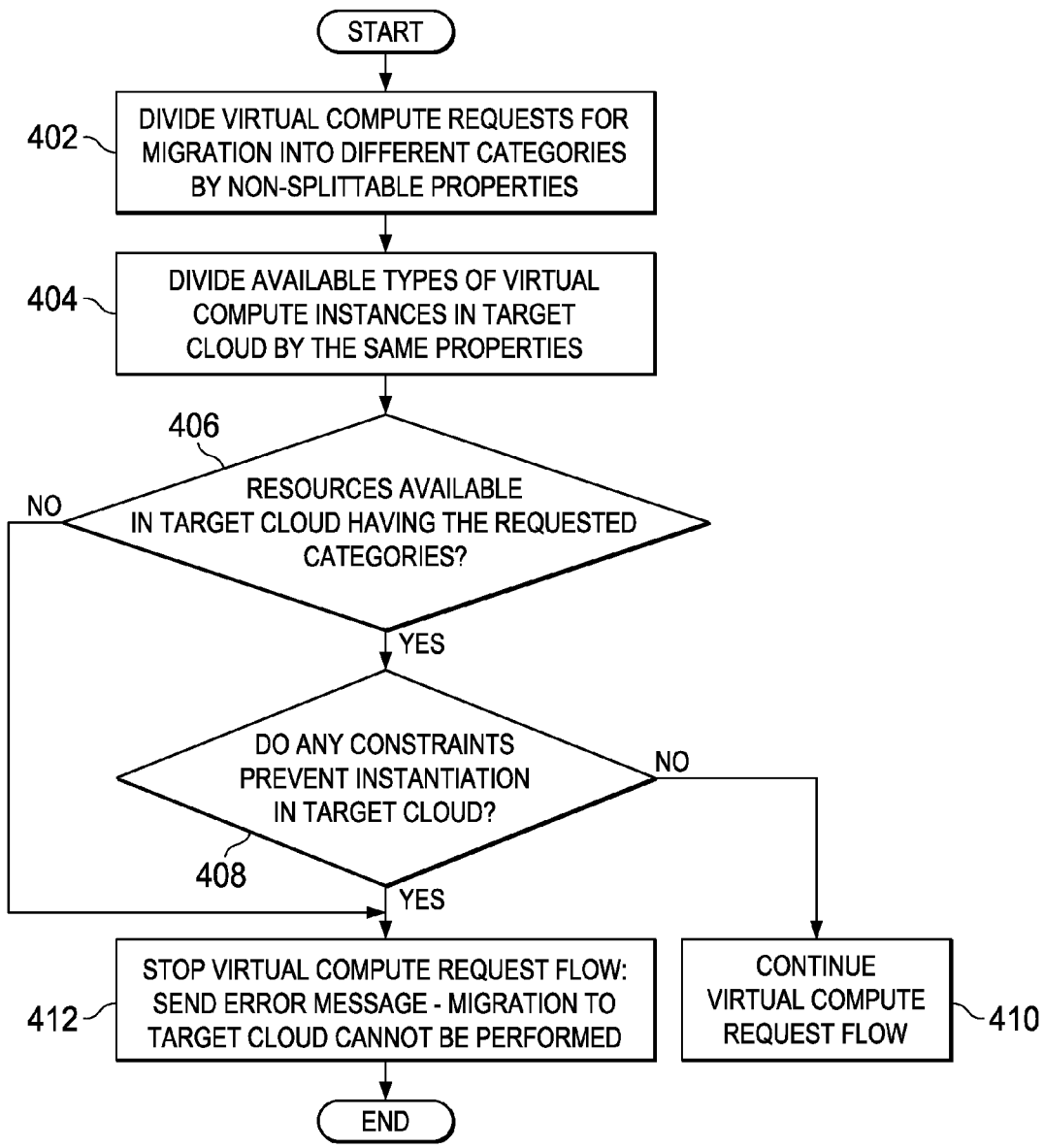
FIG. 4 is a flow diagram illustrating possible further activities associated with the migration system according to at least one embodiment.

Turning to FIG. 4, a flow diagram 400 illustrates example activities that may be associated with embodiments of migration system 100 to instantiate incompatible virtual compute requests in heterogeneous cloud environments. In at least one embodiment, a set of operations corresponds to the activities of FIG. 4, which may be performed at 310 of FIG. 3. In one example, a network element, such as resource manager 130, may perform one or more operations of the set of operations. This network element may comprise means, including for example, processor 139, for performing such operations. In at least one embodiment, one or more modules of resource manager 130 (e.g., feasibility module 135) are configured to perform, when executed by a processor, one or more operations of the set of operations.

At 402, the virtual compute requests for migration can be divided into different categories by non-splittable properties. For example, compute requests having a particular operating system and platform, which may be non-splittable, can be identified with the category corresponding to the same operating system and platform. At 404, the available types of virtual compute instances in the target cloud may be divided by the same properties (e.g., by operating systems and platforms).

At 406, a determination is made as to whether the resources available in the target cloud have the requested categories. If the resources in the target cloud do not have the requested categories, then at 412, the virtual compute request may be stopped as the migration has been determined not to be feasible. In at least one embodiment, an error message may be sent to inform the user that the requested migration cannot be performed.

However, if the resources available in the target cloud do have the requested categories, as indicated at 406, then another determination may be made at 408 as to whether any constraints prevent instantiation in the target cloud. For example, in a private cloud a constraint may provide a maximum number of a certain instance type that can be used. Thus, if any constraints prevent instantiation in the target cloud, then at 412, the virtual compute request may be stopped and an error message may be sent to inform the user that the requested migration cannot be performed. However, if at 408, it is determined that no constraints prevent instantiation in the target cloud, then the virtual compute request has been determined to be feasible and at 410, flow may return to FIG. 3 (e.g., to 312).

An example scenario is now provided to help illustrate some of the concepts of the present disclosure. Assume a service provider has a cloud offering that was selected as a target cloud by an user requesting to migrate a particular virtual application (vApp) from their private cloud. Also assume the service provider cloud offering provides the following instance type specifications:

```
instance-type-0: {
    name: m1-tiny,
    vcpu: 1,
    memory: 512MB,
    harddisk: 0
    price: 0.08
}
instance-type-1: {
    name: m1-small,
    vcpu: 1,
    memory: 2048MB,
    harddisk: 20GB,
    price: 0.10
}
instance-type-2: {
    name: m1-medium,
    vcpu: 2,
    memory: 4096MB,
    harddisk: 40GB,
    price: 0.15
}
instance-type-3: {
    name: m1-large,
    vcpus: 4,
    memory: 8192MB,
    harddisk: 80GB,
    price: 0.30
}
instance-type-4: {
    name: m1-xlarge,
    vcpus: 8,
    memory: 16384MB,
    harddisk: 160GB,
    price: 0.50
}
```

In this scenario, consider the user providing a compute request for the vApp represented by the following pseudo code:

```
{request: {
    app-name: web,
    instance-spec: {
        vcpu: {
            value: 3,
            splittable: True
        },
        memory: {
            value: 1024MB,
        },
        platform: 32bit,
        harddisk: 20GB,
    },
    instance-count: 2
    }
}
```

In this compute request, the virtual CPU is specified as splittable. Non-splittable resources require that every instance selected has at least the amount of resources requested. Values are provided for vCPU (3), memory (1024 MB), platform (32-bit), and hard disk (20 GB). The instance count is specified as 2. Based on the instance types offered by the service provider, if no options were presented in the compute request for a splittable resource, a conservative selection result could be to use 2 large instances, which costs 0.60 (0.30×2). With a splittable option for the vCPU, however, 2 medium instances and 2 small instances may be selected instead. This selection would cost 0.50 (0.10×2+ 0.15×2). Thus, the splittable option in this scenario reduces the cost of the vApp migration from the private source cloud to the selected target cloud.

Embodiments disclosed herein, at least one of which was illustrated by the above example, enable a clean separation between the service provider and customers of the service provider. Customers are provided with the ability to specify how a particular application should be migrated to a cloud, and sufficient processing may be provided in a 'middle man' such as resource manager 120 to accomplish the customer's desired goal. Thus, a user (e.g., a customer requesting migration of an application) can have their compute requests satisfied in a desired economic way, while the cloud service provider has information (e.g., splittable/mergeable configured options, optimization criteria) to enable computation of intelligent selection results without having to blindly guess at the best instance types to offer the customer. Consequently, resource waste that may occur in typical conservative approaches can be reduced and the cost to the customer may also be reduced by using cheaper instances to instantiate a large instance or by using a single larger instance to instantiate multiple small instances.

Regarding the internal configuration of migration system 100, resource manager 130 can include one or more memory elements (e.g., memory element 138) for storing information to be used in the operations outlined herein. Resource manager 130 may keep information in any suitable type of memory element (e.g., random access memory (RAM), read-only memory (ROM), erasable programmable ROM (EPROM), electrically erasable programmable ROM (EEPROM), application specific integrated circuit (ASIC), static storage, etc.), software, hardware, firmware, or in any other suitable component, device, element, or object where appropriate and based on particular needs. Any of the memory items discussed herein (e.g., memory element 138, source storage resources 118, target storage resources 128) should be construed as being encompassed within the broad term 'memory element.' Moreover, the information being used, tracked, sent, or received in migration system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable storage media. In some of these instances, memory elements can store data used for the operations described herein. This includes the memory elements being able to store software, logic, code, or processor instructions that are executed to carry out the activities described herein.

Additionally, resource manager 130 may include one or more processors (e.g., processor 139) that can execute software modules or algorithms to perform activities as discussed herein. A processor can execute any type of instructions associated with the data to achieve the operations detailed herein. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, CPUs, compute resources, modules, and machines described herein should be construed as being encompassed within the broad term 'processor.'

Note that with the example provided above, as well as numerous other examples provided herein, interaction might be described in terms of two, three, or four elements, modules, components, etc. However, this has been done for purposes of clarity and example only. In certain cases, it may be easier to describe one or more of the functionalities of a given set of flows by only referencing a limited number of elements. It should be appreciated that these elements, components, modules, and/or the like (and their teachings) are readily scalable and can accommodate a large number of such elements, modules, and components, etc., as well as more complicated/sophisticated arrangements and configurations. In addition, it should also be noted that these elements, modules and/or components may alternatively be combined in any suitable arrangements and configurations. Accordingly, the examples provided should not limit the scope or inhibit the broad teachings of the resource manager as potentially applied to a myriad of other architectures.

It should be appreciated that the words "optimize," "optimization," "optimum," "optimal," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

It is also important to note that the operations in the preceding flow diagrams illustrate only some of the possible scenarios and patterns that may be executed in association with addressing cache coherence in updates to a shared database. Some of these operations may be deleted or removed where appropriate, or may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Migration system 100 may provide substantial flexibility in that any suitable arrangements, chronologies, configurations, and timing mechanisms may be provided without departing from the teachings of the present disclosure.

What is claimed is:

1. An apparatus, comprising:
at least one processor; and
at least one memory element comprising instructions that when executed by the at least one processor cause the apparatus to:
receive a compute request for migrating an application from a source environment to a target cloud, the compute request including
a configured option of a first resource associated with the application running in the source environment, the first resource defined by a first parameter; and
generate at least one solution for migrating the application to the target cloud based, at least in part, on the configured option, wherein, if the configured option indicates the first resource is splittable, the solution includes a number of target instances in which the application is to run in the target cloud that is greater than a number of source instances in which the application runs in the source environment, and each target instance indicated in the solution includes a second resource defined by a second parameter having a lesser value than the first parameter of the first resource.

2. The apparatus of claim 1,
wherein the source instances are associated with a first instance type in the source environment.

3. The apparatus of claim 2, wherein the target instances are associated with one or more instance types.

4. The apparatus of claim 1, wherein the first resource and the second resource are a same resource type.

5. The apparatus of claim 1, wherein, if a second configured option indicates the first resource is mergeable, the instructions, when executed by the at least one processor, cause the apparatus to:
generate a second solution for migrating the application to the target cloud, wherein the second solution includes a number of second target instances in the target cloud that is less than the number of source instances in the source environment.

6. The apparatus of claim 1, wherein the instructions when executed by the at least one processor further cause the at least one processor to:
reserve one or more target instances in the target cloud corresponding to the number of target instances indicated in the solution; and
migrate the application to the target cloud to run on the one or more target instances.

7. The apparatus of claim 1 wherein, the first resource is one of a central processing unit (CPU), a memory element, and a disk storage.

8. The apparatus of claim 1, wherein the solution is based, in part, on an optimization criterion to minimize cost.

9. The apparatus of claim 1, wherein the first parameter of the first resource indicates a speed or capacity of the first resource, and wherein the second parameter of the second resource indicates a speed or capacity of the second resource.

10. At least one non-transitory computer readable storage medium having instructions stored therein, and when executed by a processor the instructions cause the processor to:
receive a compute request for migrating an application from a source environment to a target cloud, the compute request including a configured option of a first resource associated with the application running in the source environment, the first resource defined by a first parameter; and generate a solution for migrating the application to the target cloud based, at least in part, on the configured option, wherein, if the configured option indicates the first resource is splittable, the solution includes a number of target instances in which the application is to run in the target cloud that is greater than a number of source instances in which the application runs in the source environment, and each target instance indicated in the solution includes a second resource defined by a second parameter having a lesser value than the first parameter of the first resource.

11. The at least one non-transitory computer readable storage medium of claim 10,
wherein the source instances are associated with a first instance type in the source environment.

12. The at least one non-transitory computer readable storage medium of claim 10, wherein, if a second configured option indicates the first resource is mergeable, the instructions, when executed by the processor, cause the processor to:
generate a second solution for migrating the application to the target cloud, wherein the second solution includes a number of second target instances in the target cloud that is less than the number of source instances in the source environment.

13. The at least one non-transitory computer readable storage medium of claim 10, wherein the solution is based, in part, on an optimization criterion to minimize cost.

14. The at least one non-transitory computer readable storage medium of claim 10, wherein the first parameter of the first resource indicates a speed or capacity of the first resource, and wherein the second parameter of the second resource indicates a speed or capacity of the second resource.

15. The at least one non-transitory computer readable storage medium of claim 10, wherein the instructions, when executed by the processor, cause the processor to:
reserve one or more target instances in the target cloud corresponding to the number of target instances indicated in the solution; and
migrate the application to the target cloud to run on the one or more target instances.

16. A method comprising:
receiving a compute request for migrating an application from a source environment to a target cloud, the compute request including
a configured option of a first resource associated with the application running in the source environment, the first resource defined by a first parameter; and
generating a solution for migrating the application to the target cloud based, at least in part, on the configured option, wherein, if the configured option indicates the first resource is splittable, the solution includes a number of target instances in which the application is to run in the target cloud that is greater than a number of source instances in which the application runs in the source environment, and each target instance indicated in the solution includes a second resource defined by a second parameter having a lesser value than the first parameter of the first resource.

17. The method of claim 16,
wherein the source instances are associated with a first instance type in the source environment.

18. The method of claim 16, wherein, if the configured option indicates the first resource is non-splittable and non-mergeable, the solution includes a number of third target instances in the target cloud that is equal to the number of source instances in the source environment, and each third target instance indicated in the solution includes a third resource defined by a third parameter having a greater value than or equal value to the first parameter of the first resource.

19. The method of claim 16, wherein the determining the solution includes:
generating two or more solutions each based, at least in part, on the configured option; and
selecting one of the two or more solutions to be used for migrating the application to the target cloud, wherein the selecting is based on an optimization criterion to minimize cost.

20. The method of claim 16, wherein the first parameter of the first resource indicates a speed or capacity of the first resource, and wherein the second parameter of the second resource indicates a speed or capacity of the second resource.

* * * * *